April 5, 1960 C. E. PARKER 2,931,403
WORK LOADER FOR LATHES AND THE LIKE
Filed May 2, 1956 3 Sheets-Sheet 2
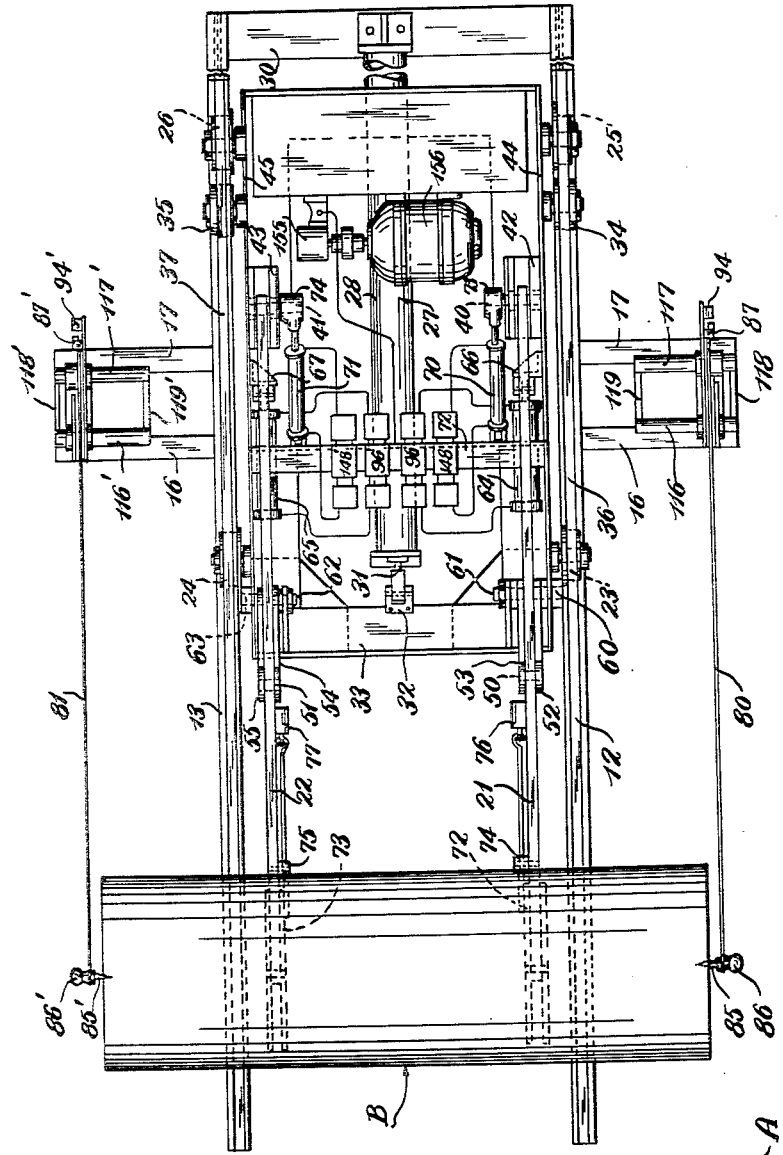
FIG. 2
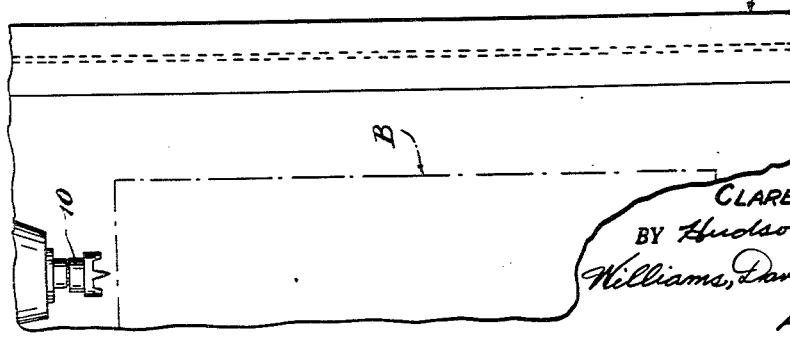
INVENTOR.
CLARENCE E. PARKER
BY
ATTORNEYS 2,931,403

Patented Apr. 5, 1960

United States Patent Office

2,931,403

WORK LOADER FOR LATHES AND THE LIKE

Clarence E. Parker, Painesville, Ohio, assignor to The Coe Manufacturing Company, Painesville, Ohio, a corporation of Ohio Application May 2, 1956, Serial No. 582,101

6 Claims. (Cl. 143—92)

The present invention relates to a method of an apparatus for lifting or supporting an object and moving it into a predetermined position, and particularly one or both ends of an irregular shaped object into alignment with a chuck or chucks of a lathe, for example, a log the opposite ends of which are to be centered or substantially centered with the chucks of a debarking, veneer or like lathe.

The principal object of the invention is the provision of a novel and improved method of an apparatus for lifting and moving an object into a predetermined position and particularly opposite ends of an irregularly shaped object, such as a log, into alignment with the chucks of a debarking, veneer or like lathe wherein any point on the end or ends of the object can be readily selected and moved into a predetermined position.

The invention resides in certain operations and constructions, combinations and arrangements of parts and further objects and advantages will be apparent to those skilled in the art to which the invention relates from the following description of the preferred embodiment described with reference to the accompanying drawings forming a part of this specification in which similar reference characters designate corresponding parts and in which:

Fig. 2 is a plan view of the apparatus shown in Fig. 1; and

Figure 1:
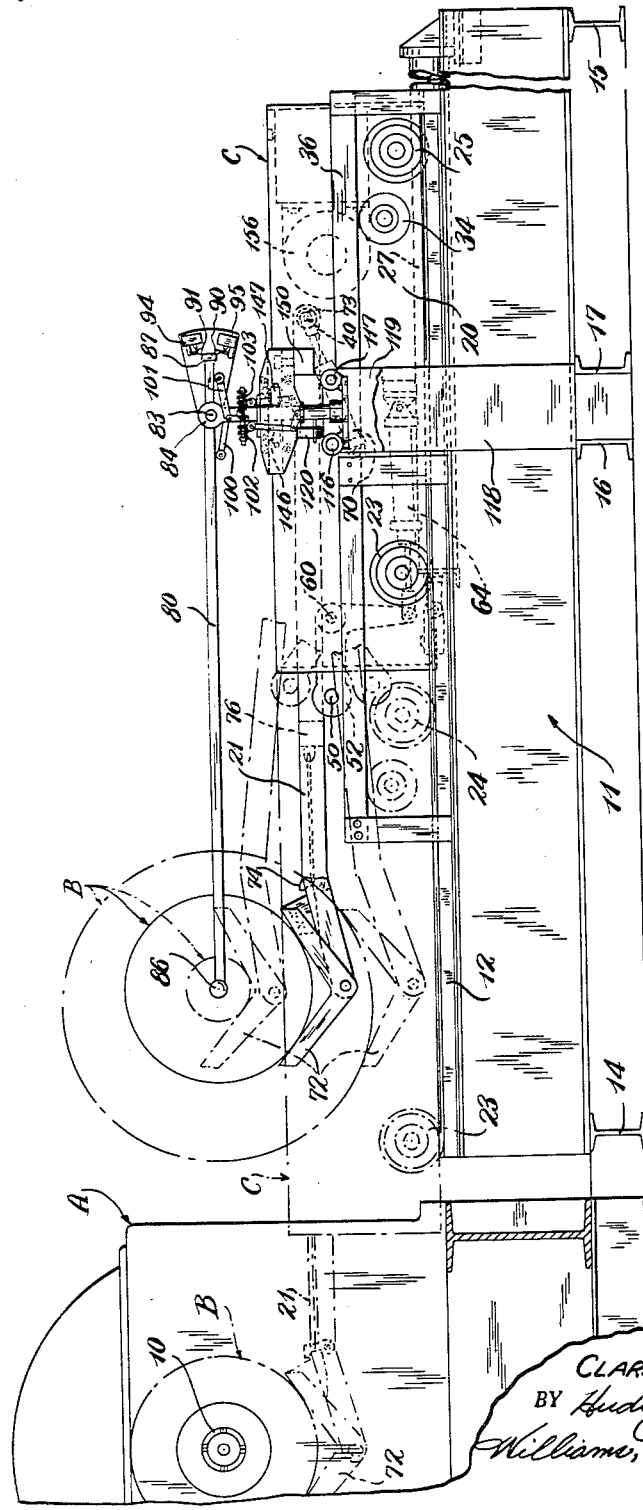
Fig. 1 is a side elevational view of an apparatus embodying the present invention especially designed for loading logs into a veneer lathe.
Figure 3:
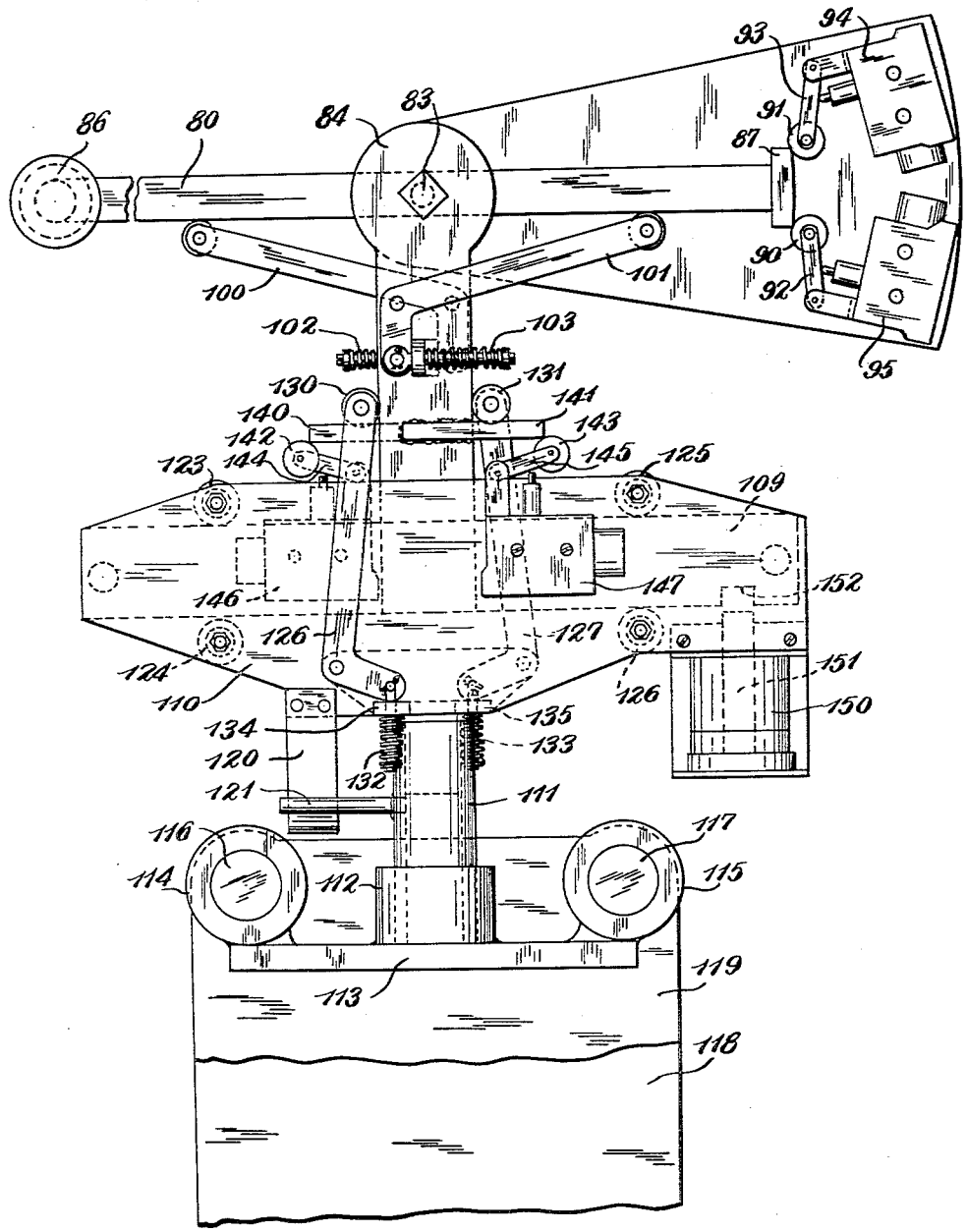
Fig. 3 is a fragmentary enlarged view of a portion of Fig. 1.

The present invention is especially applicable to the loading of logs into debarking, veneer and like lathes and is herein shown and described as embodied in an apparatus for loading logs into a veneer lathe. The loading or chucking of logs into such lathes is particularly difficult because the logs are usually quite heavy and their opposite ends are usually not only of different diameter and size but non-circular and in any case quite irregular. The logs may also be bowed or warped from end to end, etc. In practice, the operator determines by looking at each individual log the proper place to apply the lathe chucks to the respective ends of the log to obtain the best operation or production and then chucks the log by manual manipulation of some sort of overhead hoist equipment or the like. This is a very difficult time-consuming and otherwise unsatisfactory operation.

With the present method and apparatus the operator merely places two relatively light and easily moved gauge-like center or chuck locator members in the center of the respective ends of a log to be chucked or at some other desired position in the event the operator does not consider the center the most appropriate location. The position, regardless of whether it is the center or not, is determined by the judgment of the operator. After the chuck locator members are positioned, the log can be chucked by the mere actuation of a push-button switch by the operative. When these controls are actuated the log is moved by power and automatically aligned in the desired manner or position with the chucks of the lathe or other device as the case may be.

Referring to the drawings, the reference character "A" designates a veneer lathe having a pair of axially aligned power-driven chucks 10 adapted to engage opposite ends of a log, such as the log B. The log is rotated through the chucks against a knife and simultaneously fed towards the knife to produce veneer in a well-known manner. The lathe shown is of commercial construction and may be similar to that shown in U.S. Patent to Haughman, No. 2,501,387, and only these parts of the lathe are shown which are considered necessary to illustrate the use of the loading apparatus or loader shown.

The loader designated generally as "C" comprises a bed 11 including a pair of parallel side rails 12, 13 in the present instance supported on and connected to transversely extending I-beams 14, 15 and channel beams 16, 17. The side rails 12, 13 are positioned at right angles to the axis of rotation of the lathe spindles and provide a support for a carriage 20 movable thereon, which carriage is provided with a pair of log or load supporting arms 21, 22 projecting forwardly from the carriage towards the lathe and adapted to support and carry a log at their front ends. The carriage 20 is generally box-like in shape and is supported upon the rails 12, 13 by front and rear wheels 23, 24 and 25, 26 respectively. The carriage 20 is adapted to be moved from its retracted position, which is the position shown in full lines in Figs. 1 and 2, to its forward position shown in dot-dash lines in Fig. 1 and in which position a log resting upon the arms 21, 22 is aligned with the chucks of the lathe A, by a double-acting fluid pressure actuated reciprocating type motor 27, the cylinder 28 of which is connected to a cross member 30 at the rear of the bed 11 and the piston rod 31 of which is connected to a bracket 32 fixedly secured to the front cross member 33 of the carriage 20. The stroke of the motor 27 is such that as it is operated the carriage is reciprocated between the two positions shown. The carriage 20 is provided with a second pair of rear wheels 34, 35 at opposite sides thereof which engage the undersides of hold-down bars 36, 37 respectively, to prevent the carriage from tipping about the front wheels as a pivot under the weight of a log supported on the forward ends of the arms 21, 22.

The arms 21, 22 are pivotally connected at their rear or right-hand ends as viewed in Figs. 1 and 2 to shafts 40, 41 supported in slotted brackets 42, 43 for reciprocal movement lengthwise of the carriage, that is, towards and from the spindle axis of the lathe. The brackets 42, 43 are welded or otherwise secured to the side members 44, 45 of the box-like carriage frame. Forwardly of the pivots 40, 41 and adjacent to the front end of the carriage, the arms 21, 22 are supported by or rest upon pins 50, 51 fixed in and connecting the forwardly projecting arms of pairs of bell crank levers 52, 53 and 54, 55 respectively. The bell crank levers 52, 53 and 54, 55 are located at opposite sides of the respective arms 21, 22 and are pivotally supported in the front end of the carriage 20 on short shafts 60 to 63, respectively, in such a manner that the arms 21, 22 can pass from one side of their pivotal axis to the other as the bell crank levers and in turn the levers 21, 22 are oscillated. The free ends of the downwardly projecting arms of the respective pairs of bell crank levers are connected to double-acting fluid pressure actuated reciprocating type motors 64, 65 located at opposite sides of the carriage. The rear or right-hand ends of the cylinders of the motors 64, 65 are pivotally connected to brackets 66, 67 which brackets are fixedly secured to the side members 44, 45, respectively, of the carriage 20.

The pivots 40, 41 for the rear ends of the arms 21, 22 are, as previously stated, slidably supported in the slotted brackets 42, 43 for movement lengthwise of the carriage and are reciprocated lengthwise of the carriage by double-acting fluid pressure motors 70, 71, the forward ends of the cylinders of which are pivotally connected to brackets fixed to a cross-frame member 72 of the carriage 20 and the piston rods of which are connected to brackets 73, 74 fixedly secured to the inwardly projecting ends of the pivot pins 40, 41, respectively. The construction is such that the arms 21, 22 can be individually raised or lowered by the fluid pressure motors 64, 65, respectively, and can be individually moved inwardly or outwardly, that is, longitudinally of the carriage by the fluid pressure motors 70, 71, respectively, to position a log supported on the forward ends thereof in a desired location or position relative to the carriage 20.

The projecting ends of the arms or levers 21, 22 are provided with V-shaped log engaging rests or grabs 72, 73, respectively, pivotally connected thereto and normally locked or held against movement relating to the arm to which it is attached by spring biased latches 74, 75. The latches 74, 75 may be released by solenoids 76, 77 to allow withdrawal of the carriage subsequent to the chucking of a log without dropping the arms.

The actuation of the fluid pressure motors 64, 65, 70 and 71 and in turn the positioning of a log supported on the projecting arms 21, 22 of the carriage is controlled automatically by a pair of gauge rods 80, 81, one at either side of the loader. Each gauge rod controls the load supporting arm 21 or 22 adjacent thereto. The gauge rods 80, 81 are similar in construction and are supported adjacent to opposite sides of the loader in the same manner, and merely the gauge rod 80 at the near side of the loader, together with its support etc., will be described. The duplicate parts of the gauge rod 81 located at the opposite side of the loader are designated by the same reference characters with a prime mark affixed thereto.

The gauge rod 80 located at the near side of the loader as viewed in Figs. 1 and 2 is pivotally supported by a bolt 83 in a bracket 84 for swinging movement in a vertical plane, that is, about a horizontal axis, and in the embodiment shown projects both forwardly and rearwardly of the bracket 84. The forward end of the gauge rod 81 is provided with a pin 85, sometimes herein referred to as the chuck locator, projecting towards the loader proper and having a sharp end adapted to be pressed into the end of a log to be loaded. To facilitate the driving or pressing of the pin 85 into the end of the log, a hand grasp 86 is provided opposite the pin 85. The rearwardly projecting end of the gauge rod 80 is provided with a head 87 adapted to contact rollers 90, 91 carried on the free ends of operating levers 92, 93 of electric control switches 94, 95, respectively. The head 87 of the gauge rod 80 is adapted to close the switches 94, 95 as it moves up or down from an intermediate neutral or normal position in which both switches are open. The switches 94, 95 in turn control a solenoid valve 96 which valve in turn controls the flow of fluid pressure to and from the fluid pressure actuated motor 64 to raise or lower the load arm 21 depending upon whether or not the gauge rod 80 is above or below the predetermined neutral or normal position. Since this control is effective with the pin 85 engaged in the end of a log, movement of the load arm 21 will in turn move the gauge arm to its predetermined position which, in the embodiment shown is the horizontal position. As will be hereafter apparent, when the gauge rod is in its normal or horizontal position, the pin 85 is at the same elevation as the center of the chuck of the lathe, which chuck will subsequently engage the log when the carriage is moved forwardly a predetermined distance.

The gauge rod 80 is normally maintained in a generally horizontal position by a pair of bell crank levers 100, 101, pivotally connected to opposite sides of the bracket 84 underneath and to one side of the pivot 83. The bell crank levers 100, 101 are biased in clockwise and counterclockwise directions by springs 102, 103, respectively, connected to downwardly projecting arms of the levers. The other arms of the levers which normally project in outwardly and upwardly directions towards the front and rear ends of the gauge rod, are provided with rollers at their free ends which normally engage the underside of the gauge rod 80 and maintain it in a horizontal position. Movement of the bell crank levers 100, 101 under the action of the springs 102, 103 is limited by suitable stops projecting from opposite sides of the bracket 84.

The bracket 84 includes a longitudinally extending horizontal member 109 through the medium of which it is supported for movement longitudinally of the carriage in a horizontal path by a built up bracket 110. The bracket 110 is in turn pivoted to the upper end of a downwardly projecting cylinder member 111 for movement about a vertical axis. The lower end of the member 111 is fixedly supported in a boss 112 on a plate member 113 which plate member comprises front and rear boss members 114, 115 through the medium of which it is supported on parallel transversely extending cylinder rods 116, 117. Opposite ends of the rods 116, 117 are welded to vertical plate-like members 118, 119 of the bed 11 connected to the outwardly extending ends of the channel members 16, 17 which channel members project to opposite sides of the bed proper. The construction is such that the plate member 113 and the mechanism carried thereby including the gauge rod 80 can be adjusted transversely of the direction of movement of the carriage 20 to accommodate logs of different lengths. Pivotal movement of the member 110 about the vertical axis of the cylinder member 111 in an outwardly direction is limited by a downwardly projecting leaf spring 120 adapted to engage the inner side of a pin-like stop 121 fixed to the cylinder member 111.

The longitudinally extending horizontal member 109 of the bracket 84 is positioned between two parallel plate-like side members of the bracket 110 and supported in the bracket by rollers 123, 124, 125 and 126 carried by the bracket and adapted to engage opposite top and bottom sides or edges of the member 109. The bracket 84 is normally maintained in a central position with respect to the bracket 110, that is, centered above the pivotal connection between the bracket 110 and the cylinder member 111, by bell crank levers 126, 127 pivotally supported by suitable pivot pins fixed to opposite sides of the bracket 110. The levers 126, 127 have upwardly projecting arms, the free ends of which are provided with rollers 130, 131 adapted to engage the forward and rear sides of the vertical portion of the bracket 84, respectively. The bell crank levers 126, 127 are biased in clockwise and counterclockwise directions by springs 132, 133 operatively connected to the other arms of the respective levers. Movement of the bell crank levers under the action of their respective bias springs is limited by stops 134, 135 projecting from opposite sides of the bracket 110 and adapted to be engaged by the ends of the levers to which the bias springs are operatively connected.

The bracket 84 includes a pair of cam plates 140, 141 projecting forwardly and rearwardly thereof and adapted to engage rollers 142, 143 carried on the free ends of operating levers 144, 145 for electric switches 146, 147, respectively, as the bracket 84 is moved forwardly and rearwardly by the operator in positioning the pin 85 in a desired location in a log supported on the load arms 21, 22. The electric switches 146, 147, are both open when the bracket 84 is in its central or normal position, that is, the position which it normally comes to rest under the action of the springs 132, 133. When the bracket is moved either forwardly or rearwardly of its normal position the cam plates 140, 141 actuate one or the other of the switches 146, 147 to control a solenoid valve 148 which in turn controls the flow of fluid pressure to or from the fluid pressure actuated motor 70 to move the load arm 21 relative to the carriage and in turn the pin 85 fixed thereto to a position wherein the bracket 84 is again centrally located with respect to the bracket 110 and the switches 146, 147 are again inoperative. When the parts are in this position the pin 85 is a predetermined distance behind or to the right of the center line of the lathe spindles which distance in the present instance is the same as the stroke of the motor 27. As an alternative construction, an adjustable stop may be provided for limiting the forward movement of the carriage 20.

After the gauge arms 80, 81 have been positioned in the end of a log and the load arms 21, 22 moved to the predetermined position under the control of the gauge arms, the gauge arms are removed from the log and the fluid pressure actuated motor 27 energized as by the operation of an electric switch to move the carriage 20 forwardly or towards the left as viewed in Figs. 1 and 2. Because the position of the log B, prior to the movement of the carriage, is to the right of the center line of the lathe chucks, a distance equal to the stroke of the motor 27, when the motor has completed its stroke the carriage has reached is forward position with the points on the log B previously occupied by the pointed members 85, 85' in axial alignment with the axis of the respective chucks 10 of the lathe engaged thereby.

In certain instances it may be desirable to lock the bracket 84 against longitudinal movement after the arms 21, 22 have been positioned by the control and in the embodiment shown this is accomplished by a solenoid 150, the armature 151 of which is adapted to engage in a slot 152 in the longitudinally extending member 109 of the bracket 84 when the solenoid is energized. It will be apparent that when the bracket 84 is locked against longitudinal movement, the carriage can be moved forward with the pointed members 85, 85' engaged in the log and as the log moves forward they will be automatically disengaged therefrom.

After the log has been chucked in the lathe the carriage 20 is returned to its initial position by actuation of the motor 27 in the reverse direction. Prior to initial movement of the carriage 20 in reverse direction, the latches 74, 75 for the pivoted log supported levers 72, 73 are released by energization of electric solenoids 76, 77 allowing the log supported levers to pivot and the forward ends thereof to clear the log.

It is considered unnecessary to describe in more detail the electric control for the log loader as these controls are comparatively simple and can be readily understood from the foregoing description. Suffice it to say that the reference character 155 indicates a fluid pressure pump driven by an electric motor 156. The pump and motor are connected to the stationary frame of the machine as are the solenoid valves 96, 148, 96', 148'.

From the foregoing description of the preferred embodiment it will be apparent that the objects of the invention heretofore enumerated and others have been accomplished and that there has been provided a novel and improved apparatus for lifting and moving an object into a predetermined position and particularly opposite ends of an irregularly shaped object, for example, a log into alignment with the chucks of a lathe. While the preferred embodiment has been described with considerable detail, the invention is not limited thereto and it is the object to hereby cover all adaptations, modifications and uses thereof which come within the practice of those skilled in the art to which the invention relates and the scope of the appended claims.

Having thus described my invention, I claim as follows:

1. In a device of the character described a frame, a carriage, means connecting said carriage to said frame for movement in a predetermined path, a load supporting member, means connecting said load supporting member to said carriage for movement relative thereto in the general direction of said path and in a direction transversely of said path, a separate power-actuated means for moving said member in each of said directions, a control member, means connecting said control member to said frame for movement relative thereto in directions similar to those of said load supporting member relative to said carriage, and means actuated by movement of said control member from a predetermined position relative to said frame for selectively controlling the operation of said power-actuated means.

2. In a device of the character described a frame, a carriage, means connecting said carriage to said frame for movement in a linear path, a load supporting member, means connecting said load supporting member to said carriage for movement relative thereto in the direction of said path and in a direction transversely of said path, a separate power-actuated means for moving said member in each of said directions, a control member, means connecting said control member to said frame for movement relative thereto in two directions similar to those of said load supporting member, one movement being in the general direction of said path and the other movement being transversely of the first, and means actuated by movement of said control member from a predetermined position relative to said frame for selectively controlling the operation of said power-actuated means.

3. In a device of the character described a frame, a carriage, means connecting said carriage to said frame for movement in a predetermined path, a pair of load supporting members, means connecting said load supporting members to said carriage adjacent to opposite sides of said carriage for movement relative to said carriage in the direction of said path and in a direction transversely of said path, a separate power-actuated means for moving said members in each of said directions, control members, means connecting said control members to said frame adjacent to opposite sides of said carriage for movement relative thereto in directions similar to those of said load supporting members relative to said carriage, and means actuated by movement of said control members from predetermined positions relative to said frame for selectively controlling the operation of said power-actuated means.

4. In a device of the character described a frame, a carriage, means connecting said carriage to said frame for movement in a predetermined linear path, a member, means connecting said member to said carriage for movement relative thereto longitudinally of said path, power-actuated means for reciprocating said member, a load supporting arm extending forwardly of said carriage in the direction of its path of movement, means pivotally connecting said arm to said member for movement in a direction transverse to said path of movement, power actuated means for moving said arm about its pivotal connection with said member, a control member, means connecting said control member to said frame for movement relative thereto in directions similar to those of said member and said arm relative to said carriage, and means actuated by movement of said control member from a predetermined position relative to said frame for selectively controlling the actuation of said power-actuated means to move said arm to a selected position relative to said carriage.

5. In a device of the character described a frame, a carriage, means connecting said carriage to said frame for movement in a predetermined linear path, means for moving said carriage in said path, a pair of members, means connecting said members to said carriage for movement relative thereto longitudinally of said path, power-actuated means for reciprocating said members, a pair of load supporting arms extending forwardly of said carriage in the direction of its path of movement, means pivotally connecting said arms to said members for movement about an axis transverse to said path of movement, power-actuated means for moving said arms about their pivotal connection with said members, control members, means connecting said control members to said frame adjacent to opposite sides of said carriage for movement relative thereto in directions similar to those of said members and said arms relative to said carriage, and means actuated by movement of said control members from predetermined positions relative to said frame for selectively controlling the operation of said power-actuated means.

6. In a device of the character described a frame, a carriage, means connecting said carriage to said frame for linear movement, means for reciprocating said carriage in a predetermined path, a pair of members, means connecting said members to said carriage adjacent to opposite sides thereof for movement relative thereto longitudinally of said path, power-actuated means including fluid pressure operated motors for reciprocating said members, load supporting arms extending forwardly of said carriage in the direction of its path of movement, means pivotally connecting said arms to said members, power-actuated means including pressure fluid motors for moving said arms about their pivotal connection with said member, a bracket supported on said frame for movement relative thereto parallel with the path of movement of said carriage, a gauge arm pivotally connected to said bracket, and means including electric switches actuated by movements of said brackets and said gauge arms from predetermined positions relative to said frame and to each other for selectively controlling the actuation of said fluid pressure motors to move said load supporting arms to selected positions relative to said carriage.

References Cited in the file of this patent

UNITED STATES PATENTS

| | | |
|---|---|---|
| 2,523,563 | Foreman | Sept. 26, 1950 |
| 2,679,363 | Muddiman | May 25, 1954 |